April 3, 1951 J. C. RICHARDSON 2,547,889
PIPE CONNECTOR
Filed Dec. 14, 1946

INVENTOR.
James C. Richardson
BY
Johnson, Kline and Hensel
ATTORNEYS

Patented Apr. 3, 1951

2,547,889

UNITED STATES PATENT OFFICE 2,547,889

PIPE CONNECTOR

James C. Richardson, Waterbury, Conn., assignor to The Brockway Company, Naugatuck, Conn., a corporation of Connecticut Application December 14, 1946, Serial No. 716,369

11 Claims. (Cl. 285—86)

This invention relates to connectors for ductile pipe tubing, etc., and more particularly to connectors of the type which cause the pipe to flare as the connection is being made up.

Several other species of this invention are disclosed in my co-pending applications, Serial Number 691,914, filed August 21, 1946, now Patent No. 2,497,273, and Serial Number 697,692, filed September 18, 1946, now Patent No. 2,544,108, in which the problems involved and solutions offered are fully discussed.

In the form of the invention disclosed herein, means is provided for gripping the ductile pipe to advance it over a flare-forming projection, said means being constructed to apply substantially greater gripping pressure by application of a relatively much smaller torque to the nut or draft member in making up the connection, so that the type of connector herein disclosed is particularly adapted for use in connection with rigid or thick-walled pipe, offering substantial resistance to flaring; and wherein it is desired to produce a flare without substantially increasing the size or strength of the connector parts.

As in my aforesaid co-pending applications, the parts are so designed that for connections of several sizes, the contour of each connector part, and hence the profile of the tools and gauges used for making and inspecting the parts are the same, the only difference being in the diameter of the parts. This is important from a manufacturing standpoint in that it permits the same tools and the same cams for an automatic screw machine to be used to make the parts of several sizes; and it is merely necessary to set the tools closer to or farther from the axis of the machine depending on whether the part is of small or large size.

Still another feature of the preferred form of my invention herein disclosed, which it shares in common with the construction of my co-pending application Serial Number 697,692, is the provision of means for holding the connector parts together when preassembled so that they may be supplied and installed as a unit ready to receive a piece of ductile pipe; and yet so arranged that the nut or other draft member can be readily removed from the fitting after the connection is made up therewith.

The term "pipe" used herein is intended to include all sorts of hollow bodies such as are commonly termed pipes, tubes, conduits, etc., and the term "fitting" used herein is intended to include any separate or separable or integral part of such size and form as is adapted to receive the draft member or nut of the connector.

In the construction disclosed in my aforesaid co-pending applications, the pipe is inserted in a ferrule which is compressed against the pipe at the rearward end as well as at the forward end of the ferrule, by a draft member engaging a body having a flare-forming projection for engaging a pipe. Such compression forms a positive or at least frictional driving connection between the ferrule and the pipe, to advance the end of the latter over said flare-forming projection, when the draft member is operated. The ferrule is then brought against the outer or rear surface of the flare to clamp the same against said projection.

In the construction of my co-pending application Serial Number 697,692, means was provided for obstructing forward movement of the ferrule by the draft means until one or both ends of the ferrule formed a driving connection with the pipe, such obstructing means yielding to increased pressure to permit the ferrule to advance with the pipe to flare the same and to clamp the flare against the flare-forming projection of the body.

In the construction according to the present invention, impositive obstructing means is also provided likewise, operating in such a manner as to obstruct advancement of the ferrule until a driving connection is formed between the pipe and the ferrule, and then yielding to permit advancement of the ferrule with the pipe. Such obstructing means may comprise, for example, a shoulder on the body having a cam surface for engaging a portion of the ferrule, and adapted under application of sufficient pressure to cam the engaged portion of the ferrule away from the shoulder. Alternatively, the obstructing means may comprise an inwardly tapered recess in the body into which the ferrule can enter only upon substantial deformation thereof. Such obstructing devices are advantageously arranged to position the ferrule relative to the pipe when the latter abuts the flare-forming projection on the body, so that the length of the pipe available for flaring is appropriately predetermined.

Primarily, the connector of this invention differs from those of my co-pending applications in including a clamp ring, separate from the ferrule and draft member, which is adapted to cooperate with a gradually inclined surface on the ferrule so that advancement of the clamp ring on the ferrule by the draft member will constrict the same against a length of pipe inserted in the ferrule to form a driving connection therewith, and finally upon reaching an abutment will force the ferrule forwardly together with the pipe under the action of the draft member. The provision of a clamp ring of this type engaging a gradually inclined surface greatly reduces the axial force necessary to constrict the rear end of the ferrule against the pipe, without substantially increasing the size of the ferrule or draft member. Thus, by constructing a clamp ring of relatively strong metal the connector of this invention is highly effective in flaring pipes of rigid construction, offering increased resistance to flaring.

In common with the forms of the invention shown in my aforesaid co-pending applications, the connection herein described can be attached to a fitting or body by having the draft member started thereon and inserting the pipe into the ferrule as far as it will go, i. e. until the end of the pipe engages the flare-forming projection. Upon tightening the draft member on the fitting or body, a driving connection is formed between the ferrule and the pipe and continued operation of the draft member causes the end of the pipe to ride up on the flare-forming projection and become flared, while the ferrule is forced against the rear of the flare clamping it against the projection.

After the pipe is flared and the ferrule clamped against the flare the draft member can be backed off and the ferrule and pipe can be backed away from the body for inspection, cleaning, etc. If it is not convenient to flare the pipe directly on the fitting or body to which it is to be connected, the pipe can be pre-flared by using a similarly shaped body as a tool, whereupon the connector can be applied to a fitting by simply tightening the draft member on the fitting. However, it will be seen that in the use of the connection of the invention, it is not necessary to pre-form the pipe, or to place the clamp ring or ferrule thereon; instead, it is merely necessary to cut the pipe to length, insert it into the pre-assembled ring, ferrule and draft member, and thereupon, to make up the connection.

Other features and advantages will appear from the following description taken in conjunction with the accompanying drawings wherein, Figure 1 is an axial cross-section of one form of connector in accordance with my invention, wherein the parts are assembled with a piece of ductile pipe preparatory to making up the connection.

Figure 1:
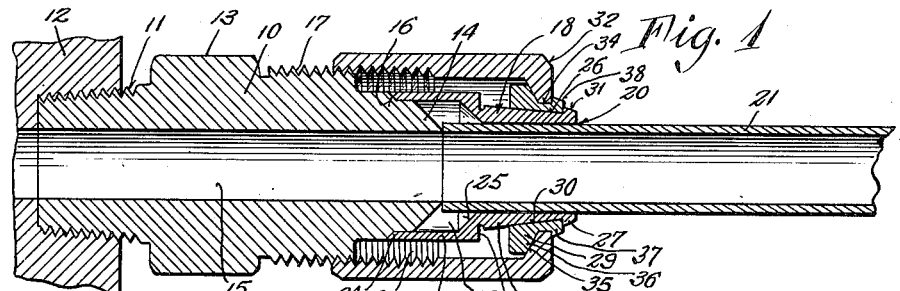

Referring to the drawings, the connector shown in Fig. 1, comprises a body or fitting 10 having a threaded portion 11 for engaging a threaded orifice in a device or structure 12, and having for example, a hexagonal nut portion 13 adapted to be engaged by a wrench or similar tool for securing the body in such orifice. If desired, however, the body 10 may be made integral with the structure 12.

At its opposite end the body has a flare-forming projection 14 of conical shape through which the central bore 15 of the body extends. Adjacent the base of the projection 14 an external shoulder 16 is provided having a cam surface, for example, of conical shape, to provide an impositive or yieldable support or obstruction for a portion of a ferrule to be engaged thereby. Behind the shoulder 16, the body includes threads 17 adapted to cooperate with a correspondingly threaded draft member for making up the connection.

The connector shown in Fig. 1 further comprises a ferrule 18 having a rearwardly extending sleeve 19, and including a central bore 20 for slidably receiving a piece of ductile pipe 21. The ferrule further includes a forwardly extending sleeve 22 surrounding a counterbore 23 of substantially larger diameter than the bore 20 and fitting over the cylindrical base of the projection 14 so that the leading edge of the sleeve 22 can be supported by the shoulder 16 on the body, to obstruct advancement of the ferrule temporarily. The leading edge surface 24 of the sleeve 22 is advantageously formed to conform with the surface of the shoulder 16, facilitating the camming action of the latter in response to axial pressure applied between the two surfaces, so as to expand the sleeve 22 outwardly and permit the same to ride past shoulder 16 thus allowing the ferrule to continue its advancement.

The counterbore 23 extends inward to a clamping surface 25 conically shaped to conform substantially with the conical surface of the projection 14 so that these two surfaces can cooperate to clamp a flared portion of the pipe 21 between them. The length of the counterbore 23 is preferably so constructed that when the leading edge of sleeve 24 of the ferrule abuts shoulder 16 on the body, the conical clamping surface 25 is axially spaced from the conical surface of projection 14 by a distance approximating the length of the end portion of the ductile pipe 21 which is to form the flare.

The rearwardly extending sleeve 19 of the ferrule tapers gradually inward toward its rear end, thus having a gradually inclined conical surface 26 which terminates rearwardly at a narrow flange 27, and forwardly at a rectangular shoulder 28 adapted to serve as a positive abutment adjacent the junction of sleeves 19 and 22 of the ferrule.

A clamp ring 29 having an inner surface 30 conforming substantially to the conically inclined or tapered wedge surface 26, encircles the rear end of the sleeve 19 on the ferrule and is adapted when forced forwardly on said sleeve to constrict the same by reason of cooperation of its inner surface 30 with the gradually tapered surface 26. The clamp ring 29 is preferably retained on sleeve 19 by the narrow flange 27 at the rear end of said sleeve. In order to assemble the clamp ring with the sleeve 19, the ring is forced over the narrow flange 27, such assembly being facilitated by providing a chamfer 31 on the outer surface of said flange.

The connector further comprises a draft member such as the hollow nut 32 having, for example, internal threads 33 for engaging the threads 17 on the body 10 and having at its rear end an inwardly extending flange 34 provided with a conical shoulder or cam surface 35 engaging a corresponding shoulder 36 on the outer surface of the clamp ring 29. The flange 34 of the nut is preferably retained in engagement with clamp ring 29 by a narrow flange 37 on the rear end of the clamp ring which is preferably made with a chamfer 38 to facilitate assembly of the nut with the clamp ring.

Figure 2:
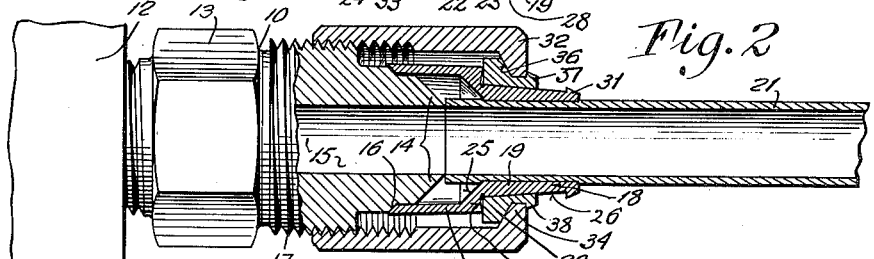
Fig. 2 is a view partly in cross-section of the connection of Fig. 1, showing the position of the parts after operation to provide a driving connection between the ductile pipe and the ferrule.
Figure 3:
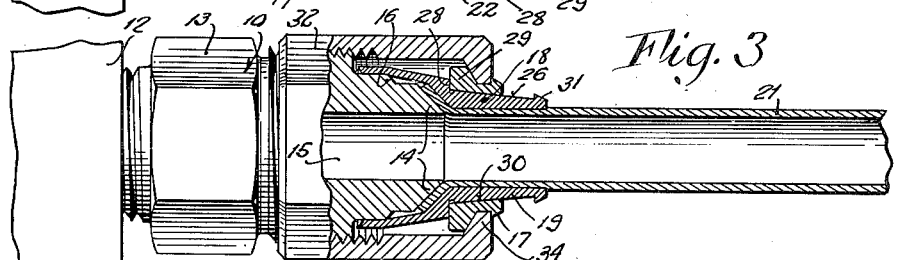
Fig. 3 is a view similar to Fig. 2, showing the position of the parts after the connection has been made up.

Thus, it will be seen in the construction shown in Figs. 1 to 3 the ferrule 18, clamp ring 29 and nut 32 can be preassembled and are held together as a unit ready to be threaded on the body 10 and to receive a length of ductile pipe 21 by reason of the interlocking engagement of flange 34 of the nut between shoulder 36 and flange 37 on the clamp ring, and by engagement of the clamp ring with the ferrule on which it is retained between flange 27 at the rear end of the sleeve 19, and shoulder 28 at the forward end of the sleeve.

In order to make up a joint with the connector just described, the nut 32 is started on the body by interengagement of threads 33 with threads 17. A length of ductile pipe 21 is inserted through the ferrule bore 20 until it abuts the end of flare-forming projection 14 on the body 20. As the nut 32 is screwed on to the body, it advances the ferrule 18 along the pipe until the leading edge 24 of the ferrule sleeve 22 encounters impositive abutment shoulder 16 on the body, i. e. until the parts reach the position shown in Fig. 1. When the parts are thus positioned, the end of the pipe 21 projects beyond the ferrule 18, a distance substantially equal to the length of the portion of the pipe which is to be flared.

As the nut 32 is further tightened, it carries the clamp ring 29 forward along the gradually inclined surface 26 of the ferrule, thereby constricting the ferrule against the walls of the pipe 21 so as to form a driving connection therewith, the ferrule remaining stationary by reason of the fact that its forward end is supported on the annular shoulder 16 of the body 10. However, when the clamp ring 29 reaches the rectangular abutment shoulder 28 on the ferrule as shown in Fig. 2, further operation of the nut 32 forces the ferrule in forward direction, causing the leading edge 24 of the ferrule sleeve 22 to expand and spring over the conical shoulder 16 on the body, and thus permitting the ferrule to advance together with the nut and clamp ring.

Such advancement of the ferrule carries with it the tube 21 by reason of the driving connection formed therewith during initial advancement of clamp ring 29; and the end of the pipe 21 projecting beyond the ferrule and abutting projection 14 rides up over the conical projection 14 of the body 10 and is flared thereby. Finally, the conical surface 25 on the interior of the ferrule engages the outside or rear of the flared portion of the pipe, and clamps the same securely against the surface of the projection 14 in the manner shown in Fig. 3.

Tightening of the nut 32 during or after the flared pipe is thus clamped, in the construction just described reinforces the radial compression applied to the ferrule by cooperation of camming surfaces 35 and 36 on the clamp ring and nut, such cooperation camming the clamp ring 29 inward to compress the ferrule against the pipe. As in my aforementioned previous application, Serial Number 697,692, the latter camming action serves a further purpose in that it tends to cause the flange 34 at the rear of the nut 32 to expand sufficiently so that the aperture defined thereby is permanently widened, and the nut 32 can thereafter be backed off the clamp ring over flange 37 without interference, when it is desired to dismantle the connection for cleaning or examination.

Figure 4:
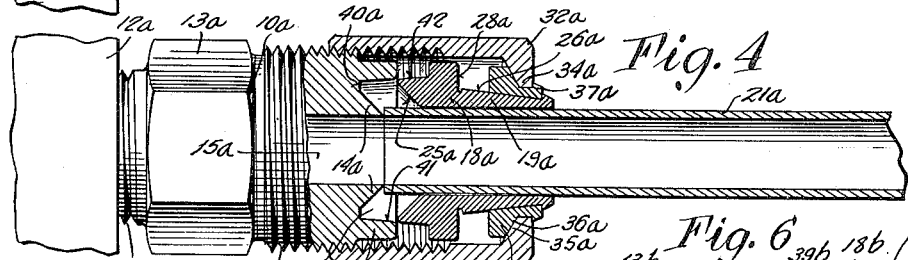
Fig. 4 is a cross-section of a modified form of connector in accordance with my invention, assembled with a piece of ductile pipe, preparatory to making up the connection.
Figures 5, 6:
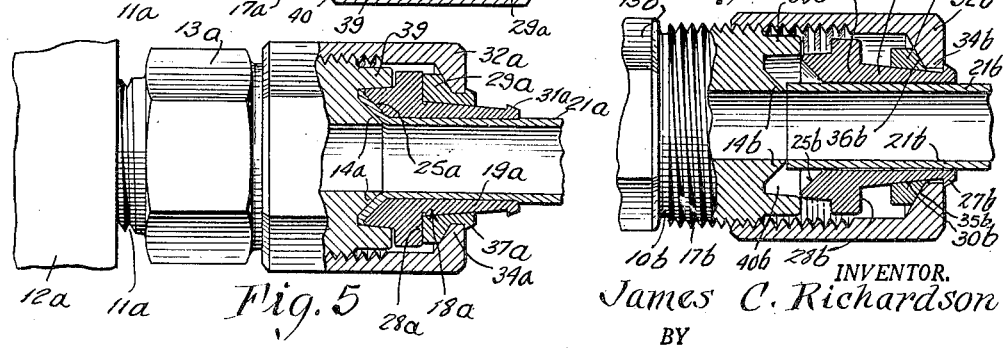
Fig. 5 is a view similar to Fig. 4 showing the position of the parts after the connection has been made up.
Fig. 6 is a view likewise in partial axial cross-section showing a modification of the construction shown in Fig. 4.

In the modification of my invention shown in Figs. 4 and 5, those portions of the structure which are similar in shape or function to those of Figs. 1 to 3, inclusive, are designated by the same reference numerals, but with the postscript a. In this construction the body 10a has a flare-forming projection 14a, surrounded by an annular forwardly projecting sleeve 39 forming an annular recess 40 which receives the flared end of the pipe 21a. The inside wall 41 of sleeve 39 preferably tapers inward toward the base of the projection 14a, and a narrow annular flat shoulder 46a at the base of the recess 40 may be formed to provide an abutment for the end of the flared portion of the pipe 21a. The ferrule 18a has a rearwardly extending sleeve 19a similar to the sleeve 19 with a gradually tapered outer surface 26a terminating at its forward end at a rectangular abutment 28a. At its forward end, the ferrule 18a has an annular projection with a forwardly tapered or cylindrical outer surface 42, adapted to enter the recess 40 on the body and to be constricted thereby, said projection terminating at the forward end of the conical clamping surface 25a, as shown. Engagement of the forward end of the ferrule 18a with the tapered constricting walls 41 of the sleeve 39 on the body provides an impositive obstruction to advancement of the ferrule toward the flare-forming projection 14a, such obstruction being overcome only upon constriction of the leading end of the ferrule. In order to facilitate entrance of the leading end of the ferrule into the recess 40 on the body, the leading edge of the ferrule and the edge of the recess 40 can be slightly rounded or chamfered as shown. The nut 32a and clamp ring 29a are similar to the corresponding parts of the connection illustrated in Figs. 1 to 3.

In making up the connection shown in Figs. 4 and 5, the nut 32a which is preassembled with clamp ring 29a and ferrule 18a, is threaded on to the body 10a until the leading end of the ferrule encounters the end of sleeve 39 at the mouth of recess 40, whereby its further advancement is impositively obstructed. The pipe 21a is inserted through the bore of the ferrule until it abuts the end of projection 14a. When the parts are assembled in this position, the length of the end of the pipe projecting beyond the conical clamping surface 25a at the forward end of the ferrule is substantially equal to the length of the end portion of the pipe to be flared.

As the nut 32a is tightened, the ferrule and pipe remain stationary while clamp ring 29a is advanced along the tapered surface 26a to compress the sleeve 19a of the ferrule against the pipe, to form a driving connection therewith. However, when the clamp ring 29a abuts the rectangular shoulder 28a of the ferrule, further tightening of the nut advances the ferrule and pipe together with the clamp ring, and the leading end of the ferrule is forced into the recess 40 surrounding projection 14a on the body. The tapered walls 41 of the recess 40 constrict the ferrule against the pipe, forming a second driving connection therewith. The pipe is thus carried forward by the ferrule, and rides up over the projection 14a to form a flare on the end of the pipe. Preferably the flare of the pipe is advanced until it abuts the base 40a of the recess 40.

Finally, the conical clamping surface 25a of the ferrule engages the rear surface of the flared portion of the pipe and clamps the latter against projection 14a on the body. Moreover, the leading end of the ferrule substantially fills the recess 40 behind the flare of the pipe thus confining the flare and forming a tight seal not only with the flared walls of the pipe, but also with the wall of the sleeve 39. The final position of the parts is shown in Fig. 5. When the pipe is made of a material having sufficient ductility, it is literally molded into the space ahead of the ferrule completely filling this space. As in the construction of Figs. 1 to 3, final tightening of nut 32a compresses clamp ring 29a against the ferrule reinforcing its compression on the pipe behind the flare and the flange 34a of the nut is sprung outward by the cooperating cam surfaces 35a and 36a, so that the nut can be backed off without interference from the flange 37a on the clamp ring 29a.

Fig. 6 shows a modification of the construction of Figs. 4 and 5, wherein similar parts are identified by the same reference numerals but with the postscript b. The construction is similar to that of Figs. 4 and 5, except that in Fig. 6, the clamp ring 43 does not protrude through flange 34b at the rear of nut 32b, and said flange is held assembled with the ferrule by engagement with the flange 27b on the rear end of the ferrule 18b. The clamp ring 43 has a tapered inner surface 39b cooperating with the tapered sleeve 19b of the ferrule to compress the same against the pipe 21b, and a cam surface 36b for cooperation with the corresponding surface 35b of flange 34b on the nut.

Operation of this form of the invention to grip the pipe and flare it over projection 14b, is similar to that of Figs. 4 and 5. Final tightening of the nut 32b after the clamp ring 43 engages the rectangular abutment shoulder 28b and forces the leading end of the ferrule into clamping engagement with the flared end of the pipe, causes expansion of the flange 34b at the rear end of the nut by cooperation of cam surfaces 35b and 36b, so that the nut can be backed off over the flange 27b at the rear end of the ferrule without interference, to dismantle the connection.

Variations and modifications may be made within the scope of this invention and portions of the improvements may be used without others.

I claim:

1. A connector for flaring the end of a ductile pipe over a flare-forming end on a body, and for clamping the flared end of the pipe against said body in leakproof engagement therewith, comprising a ferrule having a bore for slidably receiving the pipe, and means for clamping the flared end of the pipe against the end of said body; a clamp member movable along the ferrule toward said body to constrict the ferrule against the pipe and thereby form a driving connection therewith; a draft member engaging said clamp member and said body, operable on the latter to advance said clamp member in ferrule-constricting direction; cooperating means on said ferrule and body for impositively obstructing advancement of the ferrule toward said body during advancement of the clamp member to form said driving connection; and means on the ferrule operable upon continued operation of said draft member after driving connection-forming operation thereof to overcome said impositive obstructing means and to advance the ferrule and clamp member, together with the pipe, toward said flare-forming end on the body, thereby flaring the pipe and clamping the flared portion of the pipe between the end of said body and said clamping means of the ferrule.

2. A connector for flaring the end of a ductile pipe over a flare-forming end on a body, and for clamping the flared end of the pipe against said body in leakproof engagement therewith, comprising a ferrule having a bore for slidably receiving a pipe and means for clamping the flared end of the pipe against the end of said body; a clamp member movable along said ferrule toward said body to constrict the ferrule against the pipe and thereby form a driving connection therewith; a draft member engaging said clamp member and said body, operable on the latter to move said clamp member in ferrule-constricting direction; cooperating means on said ferrule and body for impositively obstructing advancement of the ferrule toward said body during advancement of the clamp member to form said driving connection; and abutment means on said ferrule engaged by said clamp member and operable, after driving connection-forming operation thereof, in response to continued operation of said draft member to overcome said impositive obstructing means and to advance the ferrule and clamp member, together with the pipe, toward said flare-forming end on the body, thereby flaring the pipe and clamping the flared portion of the pipe between the end of said body and the clamping means of said ferrule.

3. A connector for flaring the end of a ductile pipe over a flare-forming end on a body, and for clamping the flared end of the pipe against said body in leakproof engagement therewith, comprising a ferrule having a bore for slidably receiving a pipe and means for clamping the flared end of the pipe against the end of said body; a clamp member movable along said ferrule toward said body to constrict the ferrule against the pipe and thereby form a driving connection therewith; a draft member engaging said clamp member and said body, operable on the latter to move said clamp member in ferrule-constricting direction; cooperating means on said ferrule and body for impositively obstructing advancement of the ferrule toward said body during advancement of the clamp member to form said driving connection; means on the ferrule operable upon continued operation of said draft member, after driving connection-forming operation thereof, to overcome said impositive obstructing means and to advance the ferrule and clamp member together with the pipe toward said flare-forming end on the body; and cooperating means on said ferrule and body operable in response to advancement of the ferrule against the resistance of said obstructing means, to clamp the forward end of the ferrule against said pipe to form a second driving connection therewith, said continued operation of said draft member flaring the pipe and clamping the flared portion of the pipe between the flare-forming end of said body and said clamping means of the ferrule.

4. A connector for flaring the end of a ductile pipe over a flare-forming end on a body, and for clamping the flared end of the pipe against said body in leakproof engagement therewith, comprising a ferrule having a bore for slidably receiving a pipe and means for clamping the flared end of the pipe against the end of said body; a clamp member movable along said ferrule toward said body to constrict the ferrule against the pipe and thereby form a driving connection therewith; a draft member engaging said clamp member and said body, operable on the latter to move said clamp member in ferrule-constricting direction; cooperating means on said ferrule and body for impositively obstructing advancement of the ferrule toward said body during advancement of the clamp member to form said driving connection; means on the ferrule operable upon continued operation of said draft member, after driving connection-forming operation thereof, to overcome said impositive obstructing means and to advance the ferrule and clamp member together with the pipe toward said flare-forming end on the body; and cooperating means on said draft member and said clamp member, operable to compress the latter in radial direction against said ferrule in response to axial force applied by the draft member to said ferrule in pipe-flaring direction.

5. A connector for flaring the end of a ductile pipe over a flare-forming end on a body, and for clamping the flared end of the pipe against said body in leakproof engagement therewith, comprising a ferrule having a bore for slidably receiving a pipe and means for clamping the flared end of the pipe against the end of said body; a clamp member movable along said ferrule toward said body to constrict the ferrule against the pipe and thereby form a driving connection therewith; a draft member engaging said clamp member and said body, operable on the latter to move said clamp member in ferrule-constricting direction, cooperating means on said ferrule and body for impositively obstructing advancement of the ferrule toward said body during advancement of the clamp member to form said driving connection; means on the ferrule operable upon continued operation of said draft member, after driving connection-forming operation thereof, to overcome said impositive obstructing means and to advance the ferrule and clamp member together with the pipe toward said flare-forming end on the body; means for retaining said draft member assembled with said clamp member and said ferrule prior to making up the connection; and cooperating means on said clamp member and said draft member operable upon tightening the draft member after clamping said pipe against the body to deform the draft member and render said retaining means inoperative to prevent dis-assembly of the draft member from said ferrule and clamp member.

6. A connector for flaring the end of a ductile pipe over a conical flare-forming end on the body and for clamping the flared end of the pipe against said conical end in leakproof engagement therewith, comprising a ferrule having a bore for slidably receiving the pipe and a surface for clamping the flared end of the pipe against the conical end of said body; said ferrule having a gradually tapered sleeve extending rearwardly from an external annular abutment at the base of said sleeve; a clamp ring encircling said sleeve at its reduced rearward end and movable along the same to constrict the sleeve against the pipe positioned in said bore so as to form a driving connection therewith; a draft member engaging said clamp ring having threaded engagement with said body and operable thereon to advance said clamp ring along the sleeve in ferrule constricting direction; and cooperating means on said ferrule and body for impositively obstructing advancement of the ferrule toward said body during advancement of the clamp ring on said sleeve, said clamp ring, upon reaching said abutment and in response to continued operation of said draft member, advancing said ferrule against the resistance of said impositive obstructing means, and thereby advancing the pipe toward said flare-forming end on the body to flare the pipe and clamp the flared portion of the pipe between said conical end of the body and said clamping surface on the ferrule.

7. A connector for flaring the end of a ductile pipe over a conical flare-forming end on the body and for clamping the flared end of the pipe against said conical end in leakproof engagement therewith, comprising a ferrule having a bore for slidably receiving the pipe and a surface for clamping the flared end of the pipe against the conical end of said body; said ferrule having a gradually tapered sleeve extending rearwardly from an external annular abutment at the base of said sleeve; a clamp ring encircling said sleeve at its reduced rearward end and movable along the same to constrict the sleeve against the pipe positioned in said bore so as to form a driving connection therewith; a draft member engaging said clamp ring having threaded engagement with said body and operable thereon to advance said clamp ring along the sleeve in ferrule constricting direction; cooperating means on said ferrule and body for impositively obstructing advancement of the ferrule toward said body during advancement of the clamp ring on said sleeve, said clamp ring, upon reaching said abutment and in response to continued operation of said draft member, advancing said ferrule against the resistance of said impositive obstructing means, and thereby advancing the pipe toward said flare-forming end on the body to flare the pipe and clamp the flared portion of the pipe between said conical end of the body and said clamping surface on the ferrule; and cooperating cam surfaces on said draft member and said clamp ring for constricting said clamp ring against the ferrule in response to axial force applied by the draft member to the clamp member in pipe-flaring direction.

8. A connector for flaring the end of a ductile pipe over a conical flare-forming end on the body and for clamping the flared end of the pipe against said conical end in leakproof engagement therewith, comprising a ferrule having a bore for slidably receiving the pipe and a surface for clamping the flared end of the pipe against the conical end of said body, said ferrule having a gradually tapered sleeve extending rearwardly from an external annular abutment at the base of said sleeve; a clamp ring encircling said sleeve at its reduced rearward end and movable along the same to constrict the sleeve against the pipe positioned in said bore so as to form a driving connection therewith; a draft member engaging said clamp ring having threaded engagement with said body and operable thereon to advance said clamp ring along the sleeve in ferrule constricting direction; and a sleeve extending forwardly on said ferrule and engaging a conical annular shoulder on said body for impositively obstructing advancement of the ferrule during advancement of the clamp member thereon, to form said driving connection, said clamp ring upon reaching said abutment on the ferrule and in response to continued operation of the draft member forcing said forwardly extending sleeve on the ferrule to be cammed away from said conical shoulder on the body, thus releasing said impositive obstruction, the ferrule and clamp member thereupon advancing together with the pipe toward said flare-forming end on the body to flare the pipe and clamp the flared portion of the pipe between the conical end of the body and said clamping surface of the ferrule.

9. A connector for flaring the end of a ductile pipe over a conical flare-forming projection on a body and for clamping the flared end of the pipe against said end of the body in leakproof engagement therewith, comprising a ferrule having a bore for slidably receiving the pipe and a surface at its forward end for clamping the flared end of the pipe against the end of said body, said ferrule having a gradually tapered sleeve extending rearwardly from an annular abutment at the base of said sleeve; a clamp ring encircling said sleeve at its rearward end and movable toward the forward end of the sleeve to constrict the same against a pipe positioned in said bore, so as to form a driving connection with the pipe; a draft member engaging said clamp ring, having threaded engagement with said body and operable on the latter to advance said clamp ring in ferrule-constricting direction; and a sleeve on said body forming a gradually tapered recess surrounding said conical projection, the forward end of said ferrule being shaped to enter said recess upon constriction thereof, and the mouth of said recess impositively obstructing advancement of the ferrule toward said body during advancement of the clamp ring to form said driving connection, said clamp ring on reaching said abutment on the ferrule and in response to continued operation of said draft member, after driving connection-forming operation thereof, advancing said ferrule into said recess to constrict the forward end of the ferrule against the pipe and thus form a second driving connection therewith, said ferrule advancing the pipe toward said flare-forming end on the body to flare the pipe and the leading end of said ferrule substantially filling said recess behind the flared portion of the pipe and clamping the same against the flare-forming projection of said body.

10. A connector for flaring the end of a ductile pipe over a conical flare-forming end on the body and for clamping the flared end of the pipe against said conical end in leakproof engagement therewith, comprising a ferrule having a bore for slidably receiving the pipe and a surface for clamping the flared end of the pipe against the conical end of said body; said ferrule having a gradually tapered sleeve extending rearwardly from an external annular abutment at the base of said sleeve; a clamp ring encircling said sleeve at its reduced rearward end and movable along the same to constrict the sleeve against the pipe positioned in said bore so as to form a driving connection therewith; a draft member engaging said clamp ring having threaded engagement with said body and operable thereon to advance said clamp ring along the sleeve in ferrule constructing direction; cooperating means on said ferrule and body for impositively obstructing advancement of the ferrule toward said body during advancement of the clamp ring on said sleeve, said clamp ring, upon reaching said abutment and in response to continued operation of said draft member, advancing said ferrule against the resistance of said impositive obstructing means, and thereby advancing the pipe toward said flare-forming end on the body to flare the pipe and clamp the flared portion of the pipe between said conical end of the body and said clamping surface on the ferrule; a narrow outwardly extending flange on the rear of said ferrule sleeve for retaining the clamp ring thereon; a conical camming shoulder on said clamp ring and a corresponding inwardly extending flange on said draft member engaging said shoulder to move said clamp ring in pipe flaring direction; and a narrow flange on the rear of said clamp ring to retain said draft member assembled with said clamp ring, said conical shoulder on the clamp ring being operative, upon application of sufficient force to the draft member in pipe flaring pipe clamping direction, to cam said inwardly extended flange on the draft member outward so that it will clear the retaining flange on the rear end of the clamp ring upon reverse operation of the draft member.

11. A connector for flaring the end of a ductile pipe over a conical flare-forming end on the body and for clamping the flared end of the pipe against said conical end in leakproof engagement therewith, comprising a ferrule having a bore for slidably receiving the pipe and a surface for clamping the flared end of the pipe against the conical end of said body; said ferrule having a gradually tapered sleeve extending rearwardly from an external annular abutment at the base of said sleeve; a clamp ring encircling said sleeve at its reduced rearward end and movable along the same to constrict the sleeve against the pipe positioned in said bore so as to form a driving connection therewith; a draft member engaging said clamp ring having threaded engagement with said body and operable thereon to advance said clamp ring along the sleeve in ferrule constricting direction; cooperating means on said ferrule and body for impositively obstructing advancement of the ferrule toward said body during advancement of the clamp ring on said sleeve, said clamp ring, upon reaching said abutment and in response to continued operation of said draft member, advancing said ferrule against the resistance of said impositive obstructing means, and thereby advancing the pipe toward said flare-forming end on the body to flare the pipe and clamp the flared portion of the pipe between said conical end of the body and said clamping surface on the ferrule; a conical shoulder on said clamp ring and an inwardly extending flange on said draft member engaging said shoulder to move said clamp ring in pipe flaring direction; and a narrow outwardly extending flange on the rear of said sleeve on said ferrule for retaining said inwardly extending flange on the draft member in engagement with said ferrule, said conical shoulder being operative upon application of sufficient force by the draft member to the clamp ring to expand said inwardly extending flange on the draft member outward, so that it will clear said flange on the rear end of the ferrule upon reverse operation of the draft member.

JAMES C. RICHARDSON.

REFERENCES CITED

The following references are of record in the file of this patent:

UNITED STATES PATENTS

| Number | Name | Date |
|---|---|---|
| 1,789,079 | Simpson | Jan. 13, 1931 |
| 2,128,459 | Guarnaschelli | Aug. 30, 1938 |
| 2,466,057 | Soma | Aug. 5, 1940 |
| 2,320,813 | Cowles | June 1, 1943 |